No. 827,356. PATENTED JULY 31, 1906.
J. FOX.
COMBINATION PEDAL AND TOE CLIP.
APPLICATION FILED AUG. 9, 1905.

WITNESSES:
INVENTOR
John Fox
BY his ATTORNEY

UNITED STATES PATENT OFFICE.

JOHN FOX, OF TORRINGTON, CONNECTICUT.

COMBINATION PEDAL AND TOE-CLIP.

No. 827,356.  Specification of Letters Patent.  Patented July 31, 1906.

Application filed August 9, 1905. Serial No. 273,475.

*To all whom it may concern:*

Be it known that I, JOHN FOX, a citizen of the United States, residing at Torrington, in the county of Litchfield and State of Connecticut, have invented certain new and useful Improvements in Combination Pedals and Toe-Clips, of which the following is a specification.

The present invention pertains to improvements in pedals for bicycles or the like, and has for its object to arrange the pedal with a toe-clip of an integral piece in order to reduce the work and expense of manufacture thereof.

My invention will be fully understood from the accompanying drawings, in which similar reference-letters denote corresponding parts, and in which—

Figure 1:
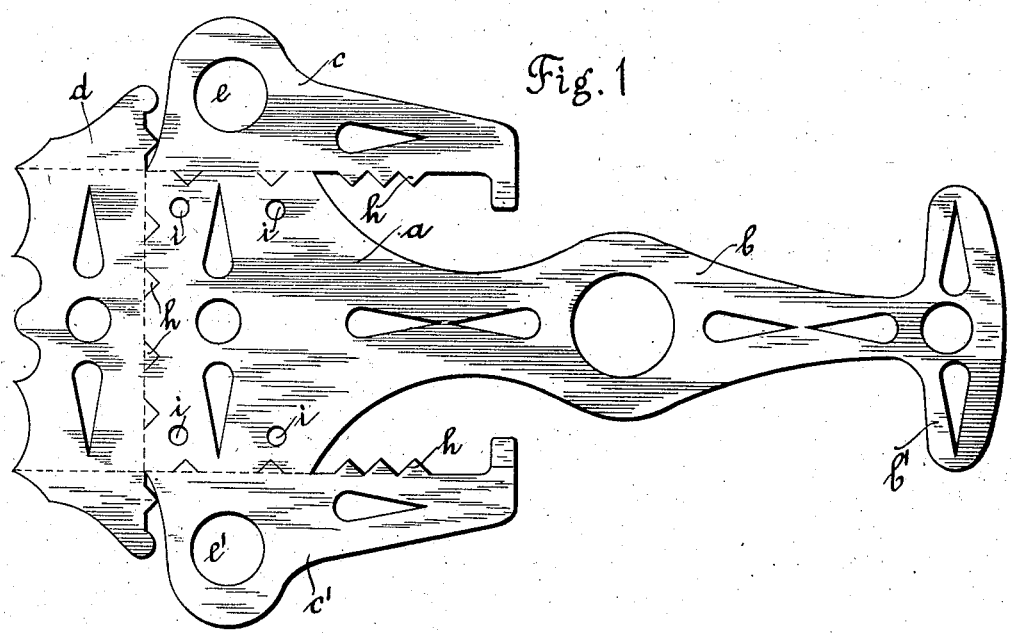
Figure 2:
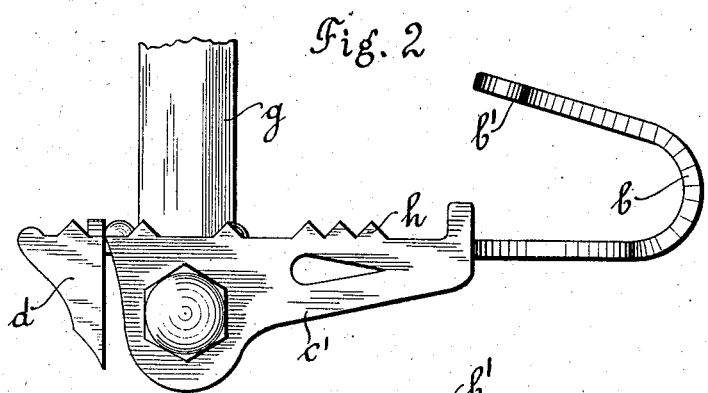
Figure 3:
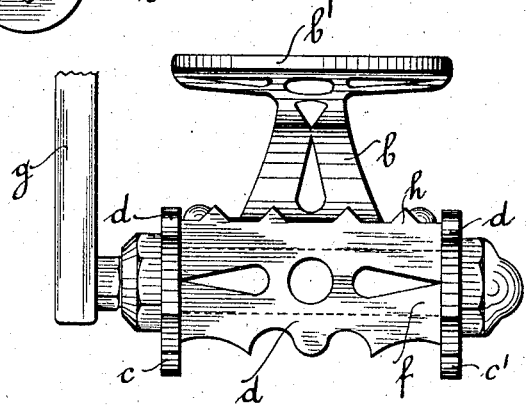

Figure 1 is a plan view of the unfolded pedal and toe-clip punched from an integral piece of metal; Fig. 2, a side view of the pedal and toe-clip formed from the piece shown in Fig. 1 by bending or folding the parts thereof to be ready for use, the same being shown as applied to the crank-lever of the bicycle; and Fig. 3 shows a rear view of the finished combination pedal and toe-clip.

In Fig. 1 I have shown the integral piece unfolded as received from a suitable punching-machine.

$a$ represents the part adapted to serve as the pedal proper, and $b$ a forward extension thereof to serve as the toe-clip. The pedal and the toe-clip are punched from an integral piece of metal, preferably steel, to a suitable shape and with any desired ornamentations, as shown in Fig. 1. The pedal is provided with lateral wings $c$ $c'$ and with a rear wing $d$, which wings are adapted to be bent downward, as shown in Figs. 2 and 3. The lateral wings are each provided with an aperture or hole $e$ $e'$ to serve as bearings for the axle $f$, Fig. 3, upon which the pedal is supported and which is to be fixed in the crank-lever $g$, Fig. 2, of the bicycle. In punching the pedal triangular cuts $h$ $h$ with their sides converging inward toward the pedal-surface are formed at the lines at which the lateral and rear wings are to be bent downward. These cuts will allow teeth or prongs projecting upward to be formed after the bending of the wings, which teeth will serve to retain the foot of the rider in proper position upon the surface of the pedal. To provide for an elastic foot-rest, the surface of the pedal may be provided with apertures or holes $i$ $i$ to receive rubber pieces or the like. The toe-clip, which is made as a forward extension of the pedal and may also receive any desired surface ornamentation, is preferably formed with a widened outer end $b'$, which when the clip is bent or folded upward and inward, as shown in Fig. 2, will fit upon the toe portion of the shoe or foot of the rider. It will be clearly understood that by this method of manufacture of the combination pedal and toe-clip the work is greatly simplified and the expense decreased.

The whole work requires practically only two steps, first, the punching of the pedal and the toe-clip from an integral piece of steel, whereby all parts, as those holding the bearings for the crank-axle, the retaining teeth or prongs, and all surface ornamentations that may be desired are simultaneously formed by one stroke, and, secondly, the bending of the lateral and rear wings and of the forward extension to serve as a toe-clip.

What I claim, and desire to secure by Letters Patent, is—

A combination pedal and toe-clip for bicycles or the like, said pedal and toe-clip being formed of an integral piece, the pedal having lateral and rear wings adapted to be bent downward the lateral wings having apertures to serve as bearings for the crank-axle of the bicycle, prongs or teeth formed at the upper edges of the wings and projecting upward from the pedal-surface to serve as foot-retainer, holes in the pedal-surface to receive pieces of rubber or the like, substantially and for the purpose as specified.

In testimony whereof I affix my signature in presence of two witnesses.

JOHN FOX.

Witnesses:
CARL A. SCHALLER,
ERNEST KIRSCHBAUM.